J. L. MURRAY.
CATAMENIAL CALENDAR.
APPLICATION FILED DEC. 3, 1919.
1,406,210.
Patented Feb. 14, 1922.
2 SHEETS—SHEET 1.
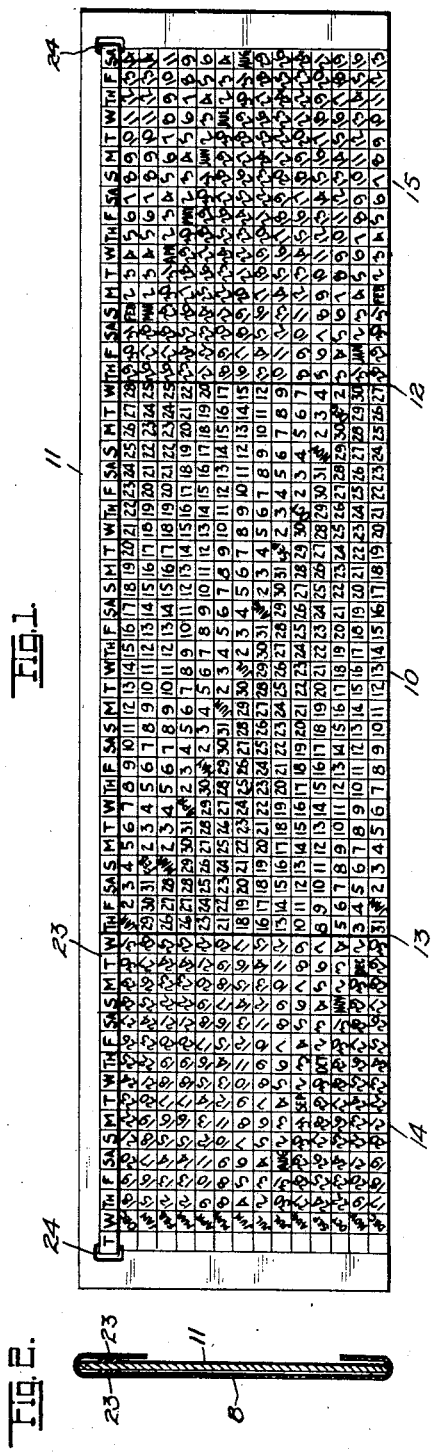
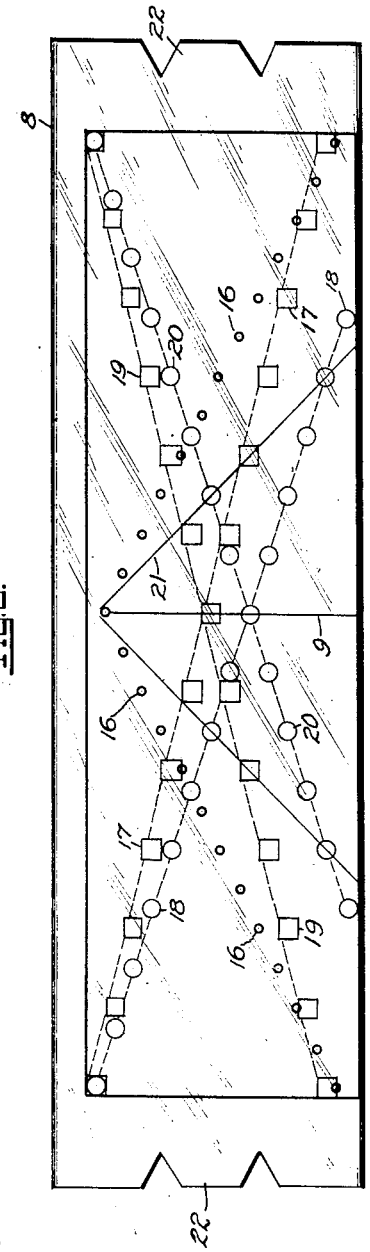
Inventor
JOHN L. MURRAY
By his Attorney

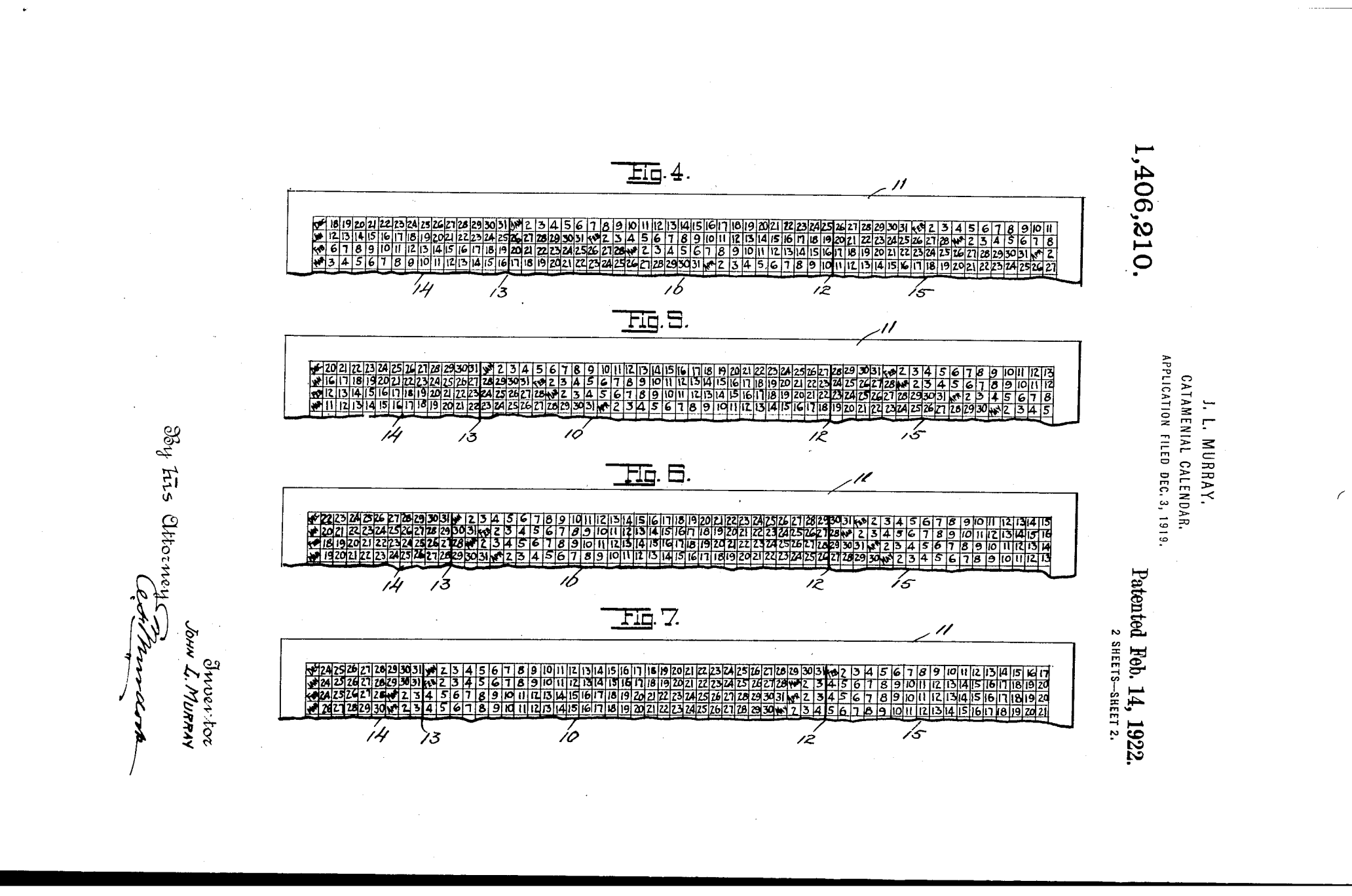

J. L. MURRAY.
CATAMENIAL CALENDAR.
APPLICATION FILED DEC. 3, 1919.

1,406,210.

Patented Feb. 14, 1922.
2 SHEETS—SHEET 2.

Inventor
JOHN L. MURRAY
By his Attorney

UNITED STATES PATENT OFFICE.

JOHN L. MURRAY, OF AUDUBON, NEW JERSEY.

CATAMENIAL CALENDAR.

1,406,210.

Specification of Letters Patent.  Patented Feb. 14, 1922.

Application filed December 3, 1919. Serial No. 342,143.

*To all whom it may concern:*

Be it known that I, JOHN L. MURRAY, a citizen of the United States, and a resident of Audubon, in the county of Camden, and State of New Jersey, have invented certain new and useful Improvements in Catamenial Calendars, of which the following is a full, clear, exact description.

Among the principal objects which the present invention has in view are: to enable one to ascertain future dates of fixed periods of time; to provide a calendar of the character mentioned, with distinctive series, showing periods of time which may be selectively adopted; and to furnish a continuous calendar or set of calendars arranged in spaces divided or tabulated according to periods required.

Drawings.

Figure 1 is a side view of a calendar, constructed and arranged in accordance with the present invention.

Figure 2 is a cross section thereof.

Figure 3 is a face view of a transparent cover container having indices thereon for decreasing or increasing the periods referred to, in conjunction with any one of the set of calendars.

Figures 4 to 7 show a modified form of the invention wherein the calendars are arranged to disclose, of themselves, each a different period grouping.

Description.

The calendar herein described is designed to be used by women for ascertaining future datings reckoned, as per the week, and day of the month of certain happenings.

To make the employment of the calendars universal, the cover 8 has imprinted thereon a number of distinctive marks arranged to provide periods, longer and shorter. These series are all arranged with reference to a vertical line that indicates the base period of the calendar, half of the series extending forward, and the other half backward. Those extending backward are arranged to ascertain the shorter periods, and those extending forward indicate the lengthened periods. The index of the basic period, is the line 9, which indicates on the calendar, the successive intervals of days, numbered according to the number of days that compose the series of indices of the calendar selected.

In the main body 10 of the calendar chart 11, the month indications are printed with reference to twenty-eight day intervals. Referring to Fig. 1, it will be noted that at the top of the panel 10, January is printed on the block of the chart identified with the first day of the month. The succeeding numerals indicate the succeeding days up to twenty-eight, which is juxtaposed to the margin line of the body 10. The numerals 29, 30 and 31 on the next line of blocks juxtaposed to the margin 13 of the body 10, are dates in January, which are separated by twenty-eight day intervals from the dates indicated by the numerals 1, 2 and 3 of January, or in other words, if the cover 8 be shifted to dispose the line 9 over the third of January, then the twenty-eight day interval would be shown directly below, which would be the thirty-first of January, and thereafter, the following day showing terminations of the twenty-eight day intervals would be indicated in correspondence therewith. The first of February is disposed below the fourth of January, thus providing a twenty-eight day interval, and so on, the calendar proceeds giving the full days of each month, on the twenty-eight day panel 10. The abbreviations for the months, January, February, March, April, May, etc., are printed across the panel 10 in a declining path as shown.

The panels 14 and 15 are auxiliary to the panel 10 and are employed to carry out or extend the numerals indicating the yearly calendar so as to accommodate, for convenience, those intervals disposed in angular lines too long to be superposed entirely within the panel 10. Thus, referring to Fig. 1 of the drawings, it will be seen that on the top line of the chart, the numeral 28 juxtaposed to the margin line 12, is the last to appear on the right-hand side of the panel 10, while on the panel 15 juxtaposed to the margin line 12, the numerals 29, 30, 31 are printed seriatim, completing the month according to the yearly calendar, or what is sometimes termed the "solar" month.

It will be found that one of the series of symbols indicated by the numerals 16, 17, 18, 19, 20 and 21 will correspond with the period desired when they are read either forward or from the left to the right, or backward from the right to the left. If read backward, the periods will be shortened, due to the fact that the date indicated on the netherposed line corresponds with a date in advance of the vertical line period, which derives its specificity from the calendar selected basic period. The angle at which the indices are placed corresponds with the increment or decrement of the period desired as compared with the said basic period.

Each succeeding increase of angle of line, with reference to the vertical line, indicates a successive increment or decrement of one day with reference to the intervals of the series of periods indicated by the vertical line, reading from the top edge of the cover 8 increasingly to the right and decreasingly to the left. The calendars, as selected and used singly in conjunction with the cover 8 give definite numerical character to the symbols on the cover 8 denoting time intervals; the series of symbols on the cover determine the limits of time intervals, regularly disposed in any one line, in conjunction with any one of the set of calendars, varying in number of days according to the calendar selected but uniformly in the amount of increment or decrement according to angular deviation from the vertical line series.

The cover 8 is provided at both ends with tabs 22 which may be lifted slightly from the chart 11 to form a handle for manipulating the cover with reference to the chart.

Symbols indicating the days of the week are printed upon a continuous strip 23 which extend through openings 24 in the chart 11, to permit the shifting of the strip to dispose the days of the week correctly with reference to the vertical columns of the figures, and thus provide for continuing the calendar from year to year.

Figures 4, 5, 6, and 7 indicate other members of the set of calendars disposed each in different series to be read by the symbols on the cover 8. Thus, we find that in Fig. 4, periods of twenty-five days are obtained when read by the vertical line group of series on the cover 8. In Fig. 5 periods of twenty-seven days are obtained and so on until Fig. 7, periods of thirty-one days are so obtained. Any of these periods may be increased or decreased by reference to the other series of internal groupings on the cover 8 marked 16 to 21.

It will be understood that on the back of the calendars indicated in the drawings by Figures 4, 5, 6 and 7, will be the intermediate periods. As for instance, on the back of the calendar shown in Fig. 4, there will be a calendar indicating the twenty-six day period, and on the back of the calendar indicated in Fig. 5, there will be a calendar indicating a twenty-eight day period. In other respects of construction the calendars shown in Figures 4, 5, 6, and 7 are like those shown in Fig. 1.

*Claims.*

1. A calendar having indices, serially and continuously disposed, for indicating successively the days of the year and of the months thereof in correspondence with said months, said indices being grouped in successive lines said lines having an arbitrary number of days each; a plurality of symbols for indicating the successive months, each symbol being disposed in the space corresponding with the first day of the month to which the symbol belongs; and a plurality of auxiliary calendar sections constituting extensions of the first mentioned calendar sections, said auxiliary calendars having indices thereon aligned with the indices of the said calendar, said indices continuing, seriatim, the indices contained in the said calendar.

2. A calendar having indices, serially and continuously disposed, for indicating successively the days of the year and of the months thereof in correspondence with said months, said indices being grouped in successive lines said lines having an arbitrary number of days each; a plurality of symbols for indicating the successive months, each symbol being disposed in the space corresponding with the first day of the month to which the symbol belongs; and a plurality of auxiliary calendar sections operatively connected with the first mentioned calendars at opposite ends thereof, said auxiliary calendars having indices corresponding with and in accord with the serial arrangement of the indices on the said calendars for continuing the reading of the indices in the said calendar on the same level in both directions, and in correspondence with the month symbol to which they belong.

3. A calendar having indices, serially and continuously disposed, for indicating successively the days of the year and of the months thereon in correspondence with said months, said indices being grouped in successive lines, said lines having an arbitrary number of days each; and means operatively connected with said calendars for indicating in groups, the days of successive months corresponding with regular periods, each group of periods being of different interval value, varyingly in number of days according to the calendar selected, but varying uniformly in decrement or increment, by angular relation to a vertical line indicating the interval of the number of days of the indices series of the calendar selected.

4. A calendar having indices, serially and continuously disposed, for indicating successively the days of the year and of the month thereof in correspondence with said months, said indices being grouped in successive lines said lines having an arbitrary number of days each and each calendar of a different predetermined number of days to the line; a continuous strip, and a transparent member having imprinted thereon, in straight line groups, at different angles, indices for grouping days of successive months, disposed at regular intervals, and a vertical line group, which derives its specificity of interval from the calendar selected, and from which, by angular deviation, the other straight line groups derive their respective increment or decrement of interval.

JOHN L. MURRAY.